(12) United States Patent
Locascio

(10) Patent No.: US 6,519,628 B1
(45) Date of Patent: Feb. 11, 2003

(54) METHOD AND SYSTEM FOR CUSTOMER SERVICE USING A PACKET SWITCHED NETWORK

(75) Inventor: Robert Peter Locascio, New York, NY (US)

(73) Assignee: Live Person, Inc., New York, NY (US)

(*) Notice: Subject to any disclaimer, the term of this patent is extended or adjusted under 35 U.S.C. 154(b) by 0 days.

(21) Appl. No.: 09/275,576

(22) Filed: Mar. 24, 1999

(51) Int. Cl.[7] .............................................. G06F 13/00
(52) U.S. Cl. ....................................................... 709/204
(58) Field of Search ................................. 709/204, 224, 709/227, 203, 206

(56) References Cited

U.S. PATENT DOCUMENTS

| | | | |
|---|---|---|---|
| 5,208,748 A | 5/1993 | Flores et al. ................ 364/419 |
| 5,289,371 A | 2/1994 | Abel et al. .................. 364/401 |
| 5,319,542 A | 6/1994 | King, Jr. et al. ............ 364/401 |
| 5,351,186 A | 9/1994 | Bullock et al. ............. 364/401 |
| 5,563,805 A | 10/1996 | Arbuckle et al. ....... 364/514 C |
| 5,572,643 A | 11/1996 | Judson ........................ 395/793 |
| 5,581,702 A | 12/1996 | McArdle et al. ....... 395/200.04 |
| 5,592,378 A | 1/1997 | Cameron et al. .......... 395/227 |
| 5,668,953 A | 9/1997 | Sloo ............................... 705/1 |
| 5,678,002 A | 10/1997 | Fawcett et al. ........ 395/183.01 |
| 5,694,163 A | 12/1997 | Harrison ...................... 348/13 |
| 5,699,526 A | 12/1997 | Siefert ......................... 395/227 |
| 5,724,522 A | 3/1998 | Kagami et al. ............. 395/226 |
| 5,727,048 A | 3/1998 | Hiroshima et al. ...... 379/93.12 |
| 5,758,328 A | 5/1998 | Giovannoli .................. 705/26 |
| 5,760,771 A | 6/1998 | Blonder et al. ............. 345/336 |
| 5,761,649 A | 6/1998 | Hill ............................. 705/27 |
| 5,764,916 A | 6/1998 | Busey et al. ........... 395/200.57 |
| 5,765,142 A | 6/1998 | Allred et al. ................ 705/26 |
| 5,774,869 A | 6/1998 | Toader ......................... 705/10 |
| 5,774,870 A | 6/1998 | Storey ......................... 705/14 |
| 5,784,568 A | 7/1998 | Needham ............... 395/200.64 |
| 5,793,365 A | 8/1998 | Tang et al. .................. 345/329 |
| 5,796,393 A | 8/1998 | MacNaughton et al. .... 345/329 |
| 5,799,151 A | 8/1998 | Hoffer .................... 395/200.34 |
| 5,806,043 A | 9/1998 | Toader ......................... 705/14 |
| 5,812,769 A | 9/1998 | Graber et al. .......... 395/200.12 |
| 5,815,663 A | 9/1998 | Uomini .................. 395/200.49 |
| 5,826,241 A | 10/1998 | Stein et al. ................... 705/26 |
| 5,826,244 A | 10/1998 | Huberman .................... 705/37 |
| 5,828,839 A | 10/1998 | Moncreiff .............. 395/200.34 |
| 5,838,682 A | 11/1998 | Dekelbaum et al. ........ 370/401 |
| 5,838,910 A | 11/1998 | Domenikos et al. ... 395/200.33 |
| 5,839,117 A | 11/1998 | Cameron et al. ............. 705/27 |
| 5,850,517 A | 12/1998 | Verkler et al. ......... 395/200.32 |
| 5,852,809 A | 12/1998 | Abel et al. .................... 705/26 |
| 5,859,974 A | 1/1999 | McArdle et al. ....... 395/200.34 |
| 5,907,677 A | * 5/1999 | Glenn et al. ................. 709/206 |
| 5,916,302 A | * 6/1999 | Dunn et al. .................. 709/204 |
| 5,943,478 A | * 8/1999 | Aggarwal et al. ........... 395/187 |
| 5,958,014 A | * 9/1999 | Cave ............................ 709/229 |
| 5,974,446 A | * 10/1999 | Sonnenreich et al. ....... 709/204 |
| 6,076,100 A | * 6/2000 | Cottrille et al. ............. 709/203 |

OTHER PUBLICATIONS

Oikarinen et al. "Internet Relay Chat Protocol" RFC–1459, pp. 1–65, May 1993.* eDiet.com: Personalized Diets and Counseling, May 03, 1998, pp. 1–15.* eDiet.com: Personalized Diets, Fitness, and Counseling, May 03, 1998, pp. 1–15.

* cited by examiner

Primary Examiner—Robert B. Harrell
(74) Attorney, Agent, or Firm—Pennie & Edmonds LLP

(57) ABSTRACT

A method and system for providing customer service over a packet switched network wherein an operator interactively responds to messages from customers by sending messages over the network. Additionally, the invention is directed to storing the messages in a database and retrieving them for an examination of the level of customer service provided. The invention also allows customers to leave messages to operators who can retrieve the messages via the packet switched network, preferably by means of a web browser.

20 Claims, 27 Drawing Sheets

600

```
            <John disconnected>
John:       Thanks, Michelle, That's all I need.
Michelle:   John, I am back, the microprocessor is Pentium II
            <John is on hold>
Michelle:   Ok; but can I put you on hold just a minute?
John:       Hi, I have a question about the microprocessor.
Michelle:   Hi, John, ... how can I help you?
```
⎬ 608

Talk session between John and Michelle is now active.

602

[ Send ]  [ Hang up ]
   604       606

FIG. 6

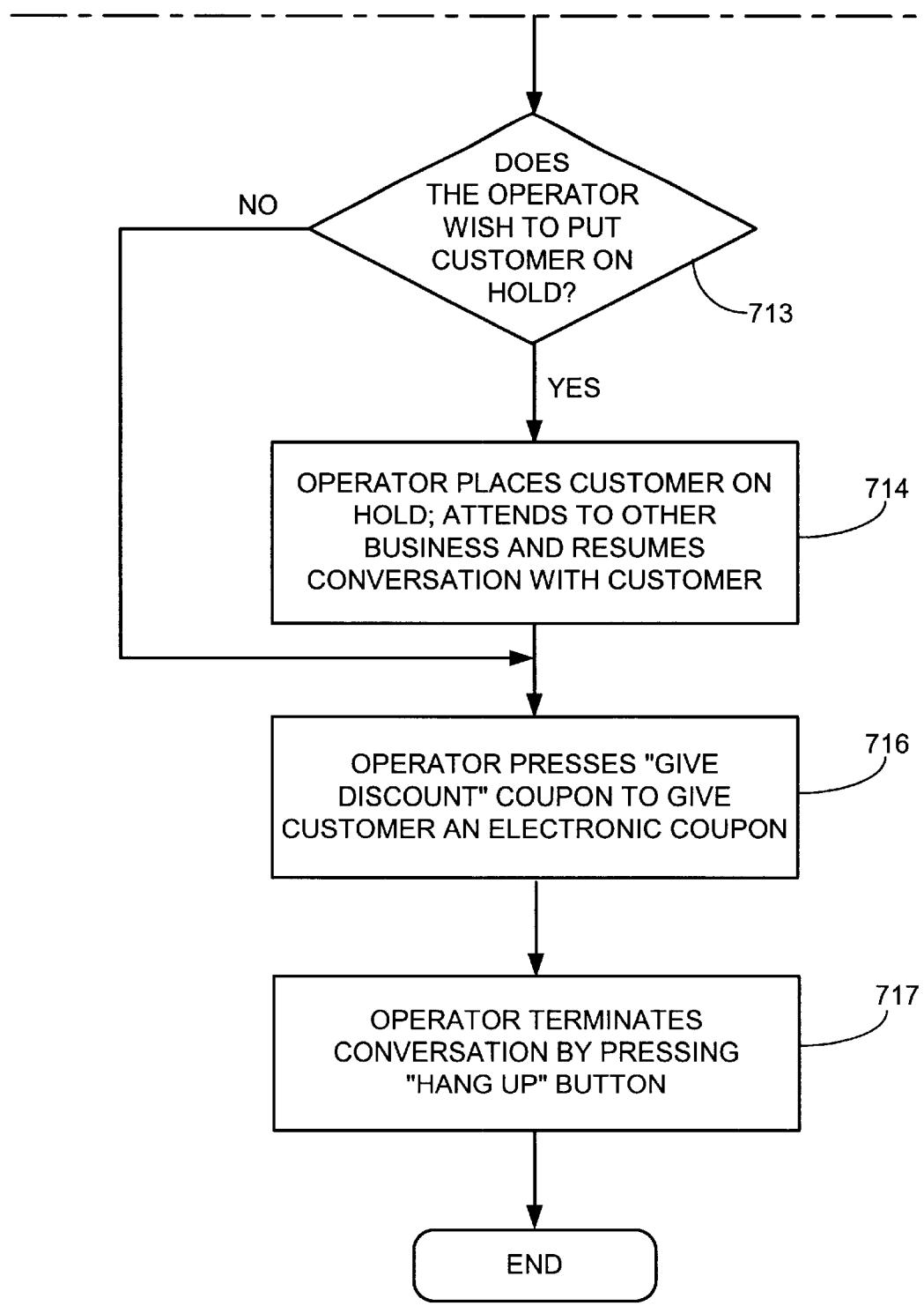
FIG. 7B

| | Grouping Agents | | |
|---|---|---|---|
| Who's On line | Delete | Group Name | Members |
| Messages | | All Users | 19 |
| | X | East Coast people interested in town | 3 |
| Profile | X | | |
| | X | Employment | 5 |
| Group Agent | X | People interested in School | 11 |
| | X | Principles in consulting | 7 |
| | X | Employees | 4 |

ADMIN. AREA

TALK MANAGER

- Create New
- Edit Fields

FIG. 16

Daily Call Statistics

| Date | Calls | Average | Minimum | Maximum |
|------|-------|---------|---------|---------|
| 10/08/98 | 42 | 2 | 0 | 10 |
| 11/08/98 | 36 | 3 | 1 | 23 |
| 12/08/98 | 28 | 2 | 0.5 | 5 |
| 13/08/98 | 48 | 1.2 | 0 | 17 |
| 14/08/98 | 57 | 5 | 7 | 6 |
| 15/08/98 | 43 | 3 | 0.5 | 12 |
| 16/08/98 | 37 | 1.5 | 0 | 9 |

1602

1600

- Who's On line
- Messages
- Profile
- Group Agent
- Call Statistics

ADMIN. AREA

TALK MANAGER

Conversation list

Search Term: [    ]    View

— 1700

| X | View | id | operator | start | hangup | Duration(mins) |
|---|------|-----|----------|-------|--------|----------------|
| ☐ | 🖼 | 124 | Michelle | 10/08/98 12:38:34 | 10/08/98 12:48:52 | 10.30 |
| ☐ | 🖼 | 123 | Michelle | 10/08/98 12:34:26 | 10/08/98 12:36:02 | 1.60 |
| ☐ | 🖼 | 122 | Michelle | 10/08/98 12:18:16 | 10/08/98 12:22:24 | 4.42 |
| ☐ | 🖼 | 121 | Michelle | 10/08/98 12:13:26 | 10/08/98 12:14:31 | 1.08 |
| ☐ | 🖼 | 120 | Michelle | 10/08/98 11:55:57 | 10/08/98 11:56:11 | 0.23 |
| ☐ | 🖼 | 119 | Michelle | 10/08/98 11:47:02 | 10/08/98 11:48:40 | 1.63 |
| ☐ | 🖼 | 116 | Michelle | 10/08/98 18:15:34 | 10/08/98 18:18:54 | 3.33 |
| ☐ | 🖼 | 115 | Michelle | 10/08/98 18:14:06 | 10/08/98 18:19:29 | 5.38 |
| ☐ | 🖼 | 114 | Michelle | 10/08/98 18:12:58 | 10/08/98 18:19:59 | 7.02 |
| ☐ | 🖼 | 113 | Michelle | 10/08/98 17:25:31 | 10/08/98 17:27:42 | 2.18 |
| ☐ | 🖼 | 112 | Michelle | 10/08/98 17:24:14 | 10/08/98 17:47:58 | 23.73 |
| ☐ | 🖼 | 111 | Michelle | 10/08/98 17:22:13 | 10/08/98 17:24:42 | 2.48 |
| ☐ | 🖼 | 110 | Michelle | 10/08/98 17:18:23 | 10/08/98 17:22:41 | 4.30 |
| ☐ | 🖼 | 109 | Michelle | 10/08/98 17:15:27 | 10/08/98 17:16:26 | 0.98 |
| ☐ | 🖼 | 108 | Michelle | 10/08/98 17:13:59 | 10/08/98 17:14:36 | 0.62 |

X  Click to delete selected conversations

FIG. 17

Grouping Agents

| Delete | Group Name | Members |
|---|---|---|
| X | All Users | 19 |
| X | East coast ppl interested in town | 3 |
| X | <u>Employment</u> | 5 |
| X | People Interested in Town | 11 |
| X | Principles in consulting | 7 |
| X | Sybarite Employees | 4 |

Create New ▶

Edit Fields ▶

FIG. 19

Make a Grouping Agent

Enter the criteria for grouping in the fields below. Fields may be left blank, or partially filled in. For example, entering 'barite' in company name will create a query that includes all sybarite employees.

| | |
|---|---|
| Group name | Employment (Internet) |
| Full Name | Internet Resume Bank |
| Company | Career Finder, Inc. |
| Please send me Information about: | ☑ Employment<br>☑ Investment<br>☑ LivePerson<br>☑ Services<br>☑ TOWN |
| Region | East Coast ▼ |
| Industry | Software development ▼ |
| Position | Service ▼ |
| Age | 26-35 ▼ |

Create New

◀ Back

FIG. 20

Profile Fields

| Field Name | Format | Elements | | |
|---|---|---|---|---|
| X Full Name | text | N/A | | |
| X Company | text | N/A | | |
| X Please send me information about | checkbox | 5 | Edit | See Stats. |
| X Region | select | 8 | Edit | See Stats. |
| X Industry | select | 22 | Edit | See Stats. |
| X Position | select | 5 | Edit | See Stats. |
| X Age | select | 6 | Edit | See Stats. |

Create a new field:

Field Name: [                    ]

Field Type: [ text ▸ ]  Update

▼ Back

FIG. 21

Edit Field Elements

Add values to profile field: Please send me information about:

| | |
|---|---|
| X | Employment |
| X | Investment |
| X | LivePerson |
| X | Services |
| X | TOWN |

[ ]

Update

◀ Back

FIG. 23

Profile for nicole@sybint.com

Field    Value

| Full Name | nicole sampogna |
|---|---|
| Company | sybarite interactive |
| Please send me information about | Employment<br>LivePerson<br>TOWN |

◀ Back

FIG. 25

Profile for Employment

Field           Criteria            Group Members

Please send me Employment    1. chellesun@hotmail.com
Information                  2. chris@SYBINT.COM
about                        3. nicole@sybint.com
                             4. rob@sybint.com
                             5. vince@nais.com

View

---

Send Email to Group

E-Mail Address:  [                    ]
                 *(i.e., you@yourhost.com)*

Sender Name:     [                    ]
                 *(i.e., John Doe)*

E-Mail Subject:  [                    ]

Body:            [                    ]

Send

◀ Back

FIG. 24

METHOD AND SYSTEM FOR CUSTOMER SERVICE USING A PACKET SWITCHED NETWORK

FIELD OF THE INVENTION

This invention is related to the art of providing interactive customer service. In particular, the invention is related to the art of using a packet-switched network such as the Internet to facilitate interaction between a customer and a customer-service representative.

BACKGROUND OF THE INVENTION

Traditionally, a business assisted its customer by providing an on-premises help desk, typically with a publicly visible sign such as "May I Help You" displayed at the help desk. In general, a customer-service representative is available at the help desk to answer questions from customers. Such help desks are common at places frequented by the general public, such as airports, train stations, banks and shopping malls. Customers usually stand in line and wait for their turn to ask questions, obtain directions, schedules or other information.

The advent of the telephone has facilitated the provisioning of such customer service from a remote location. It is no longer required that the customer-service representative be located "on premises." A telephone listing in a telephone "White Pages" directory, colloquially called "the phone book," denotes the telephone number to which a customer may place a phone call to speak to a customer service representative. Improvements in the telephone technology allow a number of customer service representatives to be listed in a telephone directory under a single telephone number. When a customer calls the listed telephone number, the call is routed to an available representative, based on a suitable algorithm. Typically, in a telephone network, such calls are placed in queues and routed to telephone operators—called "agents" in the call center dialect—by specially designed telephone equipment called an Automatic Call Distributor (ACD). Sometimes, a number of businesses join together and establish a shared telephone customer service center—sometimes called an "answering" service—to answer telephone calls and route them according to the wishes of the callers. In general, most such customer service centers use speech as a medium of communication, which is sometimes unreliable. For instance, the provider of the information may misunderstand the question asked by a customer, or the customer may forget to note the information provided to him accurately.

In telephone-based customer service centers such as those described above, supervisors of telephone operators or "agents" often tap into the telephone lines and listen to the conversations between an operator and a customer to ensure high-quality customer service. Obviously, this represents a significant commitment of the supervisor's time and adds substantially to the cost of the service.

Many telephone answering services use the so-called "toll-free" telephone access numbers. Unlike a "regular" telephone call, where a calling party pays for the service, calls made to a "toll-free" telephone access number are paid-for by the "called" party. These costs can become expensive for a business with a slim budget. A business can save the cost of maintaining a toll-free access line to its customer service department if there exists a means whereby interaction with a customer can be performed via a more cost-effective medium.

SUMMARY OF THE INVENTION

With the increasing popularity of the Internet, colloquially called the Web, as well as other data and packet-switching networks, reaching a customer service representative via the Internet has become a practically feasible alternative. However, there exist no such applications of an Internet-based customer service center to provide answers or other information to a user over the Internet or other data network.

The present invention is directed toward providing a "call center"-like customer service center via a data network. In one aspect, the invention allows customers to send messages to operators via a data network. In another aspect, customers may choose a representative to whom they could send a message for service. If no live operator is available for the customer to answer his questions, the invention provides a means whereby the customer can leave a message along with his email address for an operator to send a response at a later time.

In another aspect, the invention is a method whereby operators chat with a "live" customer; or place other customers on hold while conversing with one customer. In yet another aspect, the invention is a method wherein an operator can select a customer from the many customers who are waiting for an operator.

The invention is also a method directed to providing an administrator a view of the call center, whereby the administrator can visually obtain information about the number of operators and the customers with whom they are currently in conversation. In another aspect, the invented method provides an administrator the means with which to assign new operators, create new groups of operators who can service a particular group of customers, or reassign operators to other groups. In a yet another aspect, the invented method provides the administrator the capability to obtain various forms of statistical information or automatically generate reports on a pre-determined periodic basis or on-demand.

DESCRIPTION OF THE DRAWINGS

These and other objects, features and advantages of the invention will be more readily apparent from the following detailed description of a preferred embodiment in which:

FIGS. 2, 2A and 2B, are flow charts of a preferred mode of providing customer service over the internet;

FIGS. 3, 4, 5, and 6 are examples of web pages used in a preferred embodiment illustrating the means by which a customer interacts with the invented system;

FIGS. 7, 7A, 7B, 8, 9, 10, 11, and 12, are illustrative web pages of a preferred embodiment of the invention describing an operator's view of the invention; and FIGS. 14, 15, 16, 17, 18, 19, 20, 21, 22, 23, 24, and 25 are illustrative web pages of a preferred embodiment of the invention depicting an administrator's view of the invention.

DETAILED DESCRIPTION OF THE PREFERRED EMBODIMENTS

Figure 1A:
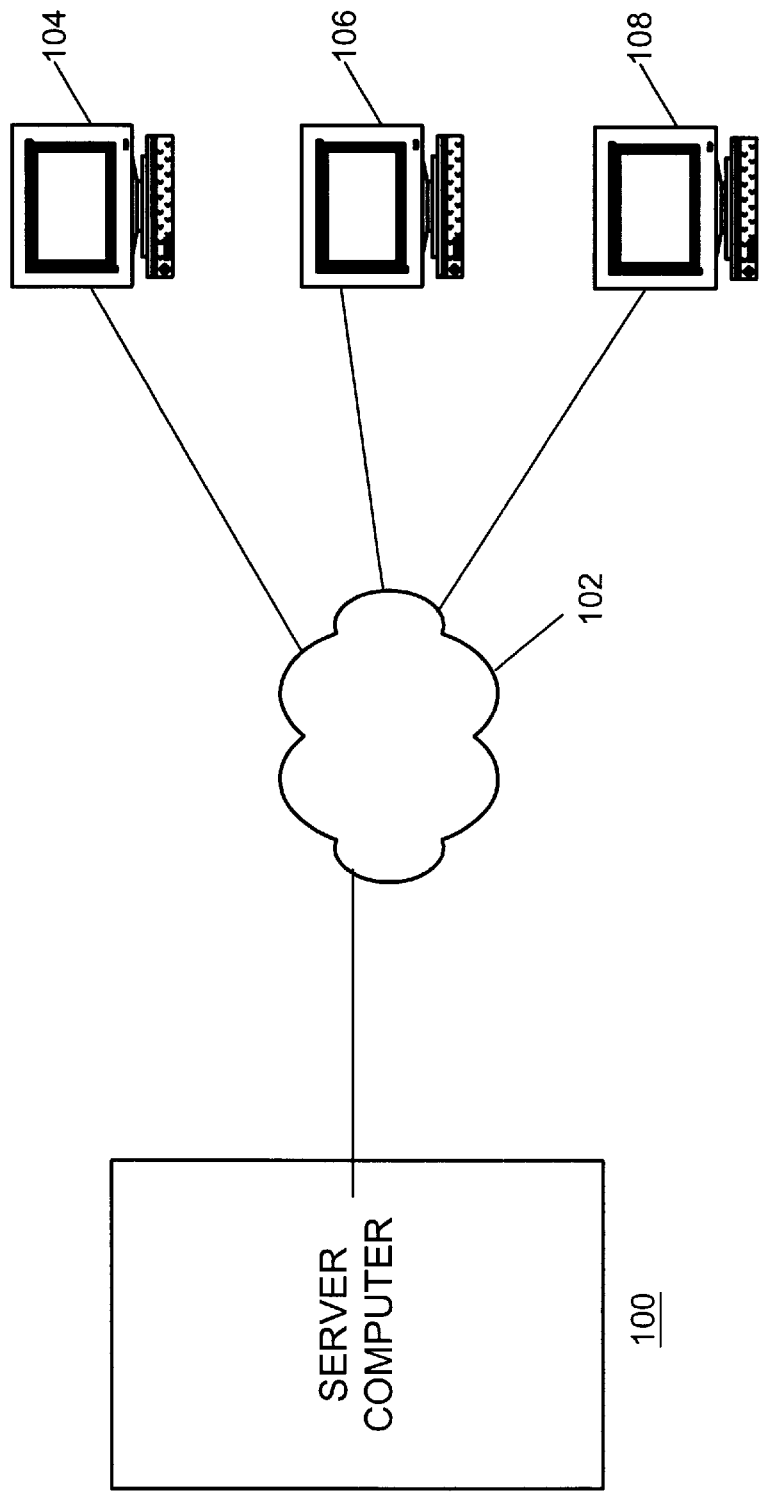
FIG. 1A is a schematic of a conventional Internet connection wherein at least one of a plurality of client computers is connected to the Internet via a server computer.

Referring to FIG. 1A, a server computer 100 operated by an Internet Customer Service Provisioning Service (ICSP) and at least one of a plurality of client computers 104, 106 and 108, are connected to the Internet 102. In a preferred configuration, the server computer comprises a microprocessor, such as a Pentium II® microprocessor, a memory device such as a semiconductor memory, and a storage device such as a disk drive. The server computer 100 is equipped and programmed to connect to the Internet 102. In a preferred embodiment, the server computer is connected to the Internet 102 via a Transport Control Protocol/Internet Protocol (TCP/IP) interface. The server computer 100 is programmed to run a "Chat" Server software, such as the Internet Relay Chat (IRC) server software. Optionally, the server computer 100 is equipped with a database 150 such as an Oracle Relational Database Management System (RDBMS) for storage and retrieval of certain information.

In a preferred embodiment, each of the client computers 104, 106 and 108 is a personal computer comprising a processor such as a Pentium II® microprocessor, a display device such as a flat panel display or a CRT, a memory such as semiconductor memory, a storage device such as a disk drive, an input device such as a keyboard, and a pointing device such as a mouse. Each of the client computers 104, 106 and 108 is equipped with suitable devices and programmed to connect to the Internet 102. Additionally, the client computers 104, 106 and 108 are configured to navigate the Internet 102 via a browser such as Netscape® Communicator™ version 4.04.

The server computer 100 is configured to function as a web server. A web server is a computer equipped with files containing coded instructions, in a language such as the Hyper Text Markup Language (HTML). The server computer 100 can be accessed via the Internet 102 by a user operating a client computer 104, 106 or 108 by entering an "address" for the server computer—defined in a format called the Universal Resource Locator (URL)—in a browser program running on the client computer. Thus, when the client computer 104 transmits an appropriately encoded request message to the server computer 100 in a protocol such as the Hyper Text Transfer Protocol (HTTP), the server computer 100 receives the request, deciphers the encoded request message and transmits a response message to the client computer. If the request message contains a request to fetch a web page from the server computer 100, the server computer sends a corresponding HTML-encoded sequence of instructions to the client computer, which is thereupon displayed at the client computer as a web page.

Figure 1B:
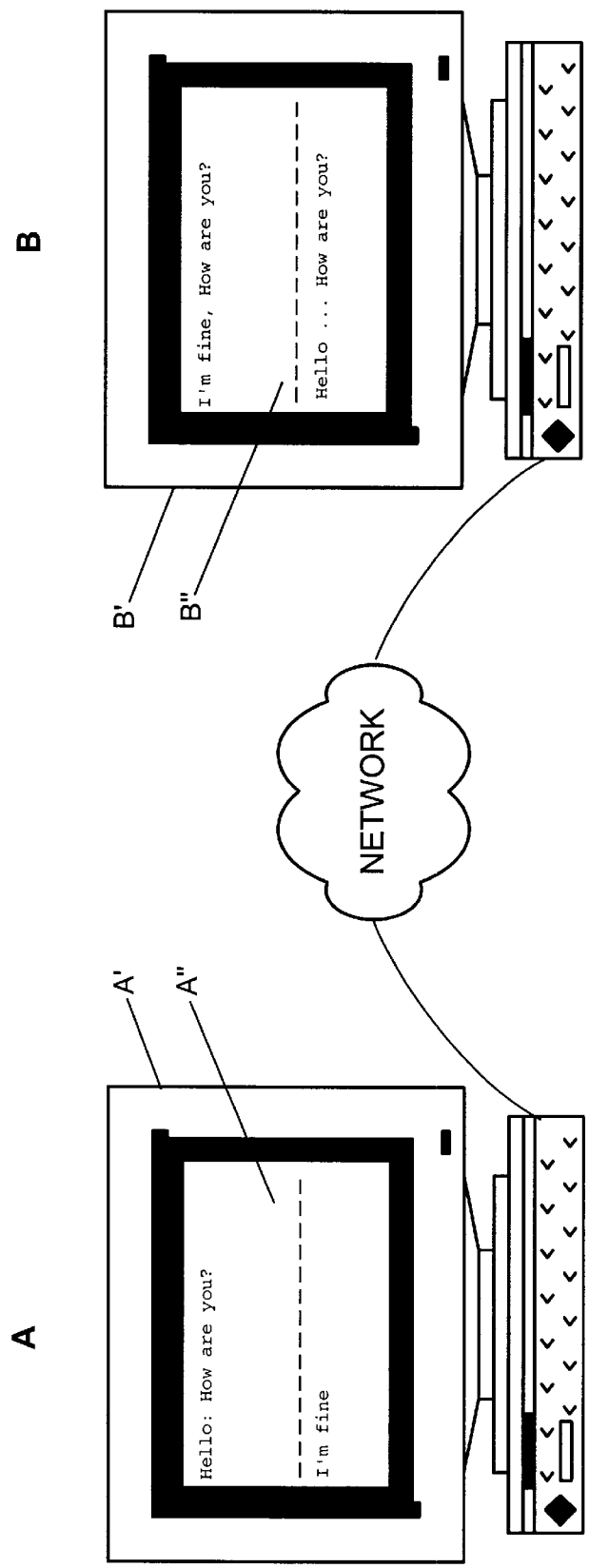
FIG. 1B is a schematic of the architecture used in a simple prior art UNIX "talk" program.

The server computer 100 is also programmed to function as a chat server. Chat servers are computers programmed to use the principles of "talk" programs, such as the UNIX™ talk program, and function in the following manner, with reference to FIG. 1B (Prior Art). First, there is established between two computers A and B a talk session, which is analogous to the establishment of a telephone connection. Assume a first party operating a computer A wishes to communicate with a second party operating a computer B. Typically, the first party logs on the computer A using his user-identifier, and runs a program called "talk," specifying the name and an electronic address of the second party at the computer B. If the second party is also logged on the computer B at the address specified by the first party, then the second party is "alerted" by his computer B, which sends a message to a terminal device B' operated by the second party. If the second party "answers" the alert message by typing the appropriate message on his computer B, a connection—typically a full-duplex connection—is established. In general, the "talking" is performed by the two parties typing their messages on their respective computers A and B, preferably on terminal devices A' and B' emulating a terminal type conforming to the VT100 standard. The typed messages are transmitted to the other party and displayed on their display devices. In most cases, the establishment of a connection also results in the partitioning of a display area A" and B" on the display devices of both parties into two portions—a "local" portion and a "remote" portion. The "local" portion of the display area displays to each party the messages he typed on his terminal device. The "remote" portion of the display area displays the messages typed by the remote party. If a party wishes to terminate the "conversation," he can type a pre-determined "disconnect" message to terminate the connection. It should be noted that though the terminology used is analogous to that of a circuit-switched telephone connection, a talk session is established as a virtual connection over a TCP/IP packet link between the two computers. Typically in these systems, a device called a "socket" is used by the first party's computer to initiate the connection. Once the connection is established, both computers use the same socket to communicate with each other. In general, each message typed at one computer is transmitted in the form of a data packet, encapsulated and formatted according to the TCP/IP specification and addressed to the destination computer. Thus, the talk program is accomplished entirely as a packet transfer system using sockets. For more information on TCP/IP and sockets, see W. Richard Stevens, *Unix Network Programming: Networking APIs: Sockets and XTI*, Vol. 1, ($2^{nd}$ Ed. October, 1997).

An improvement over the plain "talk" program is achieved by what is commonly known as a "chat" program. This typically operates in a "client-server" environment, wherein a server computer directs the traffic to several client computers, similar to a router of packets. The chat programs allow multiple parties to "converse" with each other in a "chat room." The chat room is a virtual entity wherein persons register themselves as "members" by signing-up. Typically every message sent by any member is replicated at the computer of every other member. Thus, a chat room allows multiple users to communicate with each other simultaneously. A member of a chat room is also able to send a private message to another member by appropriately encoding the message. In a private message, a sender designates a particular member of a chat room as a recipient for a message. The message is not replicated at other member computers than the one operated by the recipient. In this way, both group and one-on-one conversations are possible using a chat program. For more information on chat programs, see "Internet Relay Chat Help Archive," undated, (visited Jan. 8, 1999) <http://www.irchelp.org>.

A web-based chat server is one wherein an Internet browser can be used—instead of a VT100-like terminal device as described above—to provide an interface for a party to chat with another party. Typically a party fetches a web page from a web-based chat server. The web page contains a text area where a user can create a pseudonym-called a "nickname" or simply, a "nick"—and join an on-going conversation in a chat room among other users by simply typing the appropriate code to join the chat room. For an example of a web-based chat service, see "The Undernet," undated, (visited Jan. 8, 1999), <http://www.undernet.org>.

The present invention is directed to providing customer service using a live operator, e.g., a customer service representative, who can talk with a customer via a system such as the chat program. Unlike a traditional chat system, however, the present invention, while allowing a customer service representative to "answer" questions from a number of customers simultaneously, hides the fact that there could be other customers on line with the customer service representative. Additionally, the text messages sent by one customer or those sent by the representative to one customer do not appear at the display device of another customer. In this manner, the privacy of each customer is preserved while a number of customers are served simultaneously by a single customer service representative. Further, the present invention is readily interfaced to each customer's web site simply by installing a link to the server computer. Moreover, the invention provides an added feature. A single server comprising either a single computer or a cluster of computers interconnected together can function as the "call center" for a plurality of businesses who wish to out-source their customer service operations to the ICSP. Thus, a unique and novel feature of the present invention is that it allows a logical separation of the data related to a plurality of businesses through a single server that interfaces with an operator who can provide customer service to a diverse group of businesses. The server therefore performs a router-like function and intelligently directs conversational traffic to the pertinent locations while shielding it from the others.

In order to provide privacy and "live" one-on-one personal interaction with customers while allowing the ICSP to monitor a customer service representative or operator to ensure a high quality of service to the customers, the invented system offers three different views of the happenings within the system. They are, a customer view, an operator view and an administrator view.

When a customer places a "call" to the invented system, the system displays to each customer only the interaction between the customer and an operator. In this aspect, the customer is capable of talking to an operator by sending a text message, or can terminate the conversation. The customer has limited privileges. This customer's view is described below in conjunction with FIGS. 2–6.

When an operator signs-on, he is presented with an operator view of the system. In the operator view, the system provides an operator with a means to view the conversations with a number of customers at a time. In a preferred embodiment, the system allows up to six customers to have concurrent conversations with a single operator. The display device at the operator computer is configured to enable the operator to see which customer is waiting for the operator. The operator can select the customer and talk to that customer exclusively. This operator's view is described below in conjunction with FIGS. 7–13.

If a person signs-on as an administrator with an administrator identifier, he is given the additional privileges of monitoring all live conversations, obtaining profile information about customers currently on line with operators, organizing information in different ways, viewing which operators are on line and viewing archived conversations. The administrator's view, therefore, is similar to that of a system administrator of a computer system with super privileges. The administrator's view is described below in conjunction with FIGS. 14–19.

The Customer View

Figure 2A:
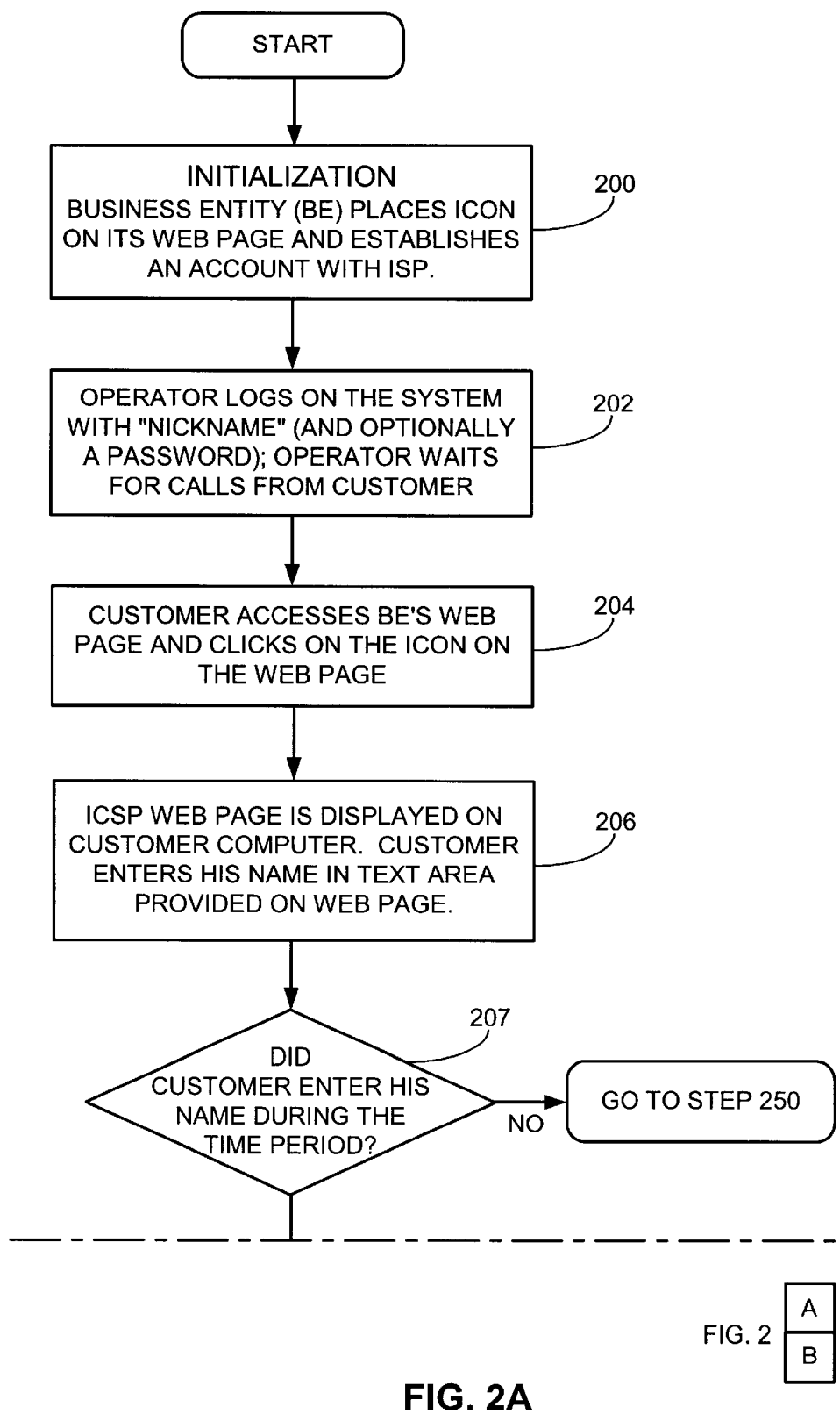
Figure 2B:
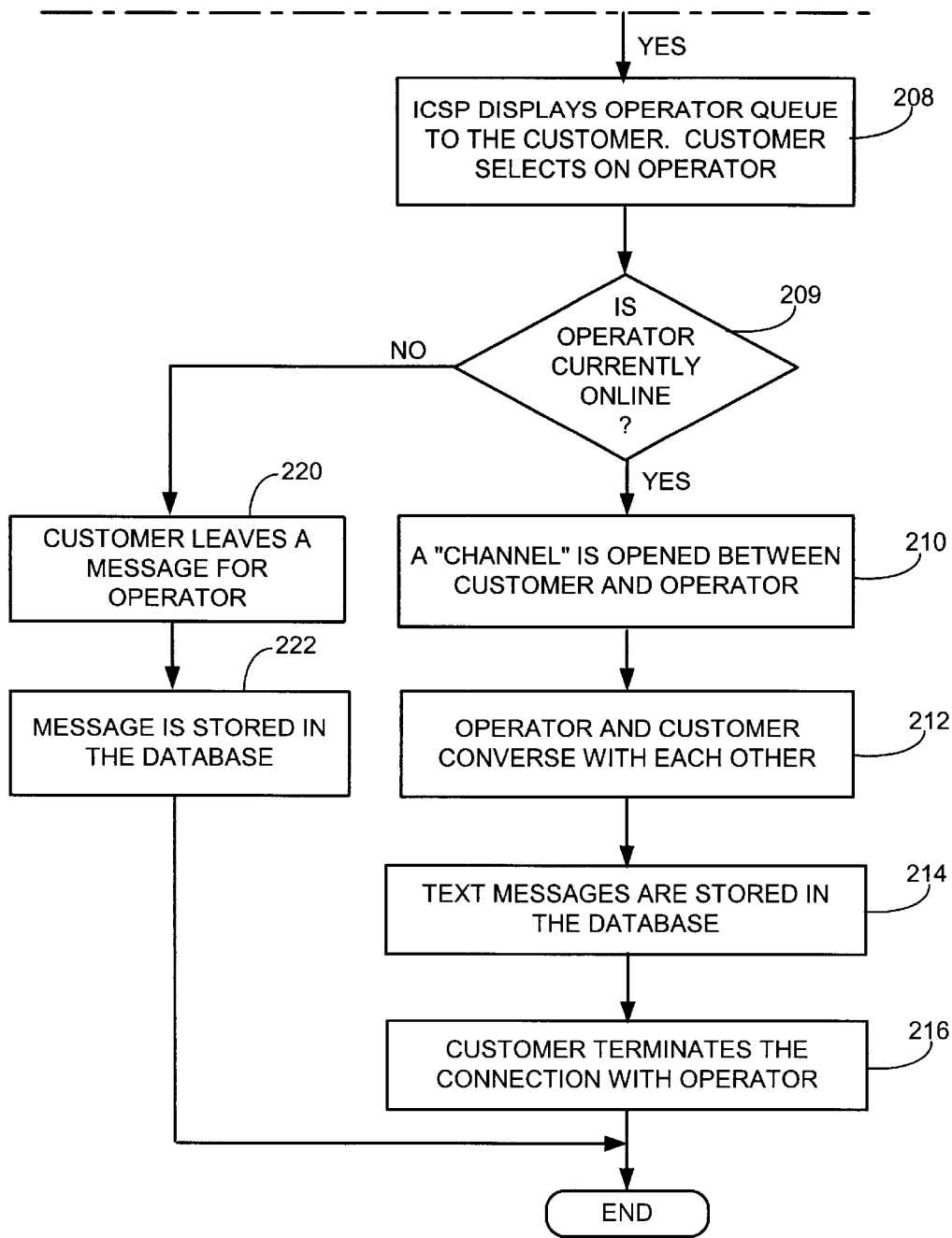

Referring to FIG. 2, during initialization, a business entity (BE) establishes an account with an ICSP and provides the ICSP with information pertinent to its business. Additionally, the BE provides a link from a web page operated by the BE on a computer such as client computer 108 to an ICSP web site, illustratively maintained on server computer 100. In a preferred embodiment, this link is an image—called an 'icon' in the computer jargon—encoded to form a "hyper-link" to allow a customer to send an HTTP request message to the server computer 100 when the image is selected by a customer. In an alternative embodiment, a text-based "hyper-link" on a web page operated by the BE on a computer such as client computer 108 can be used to provide a link (such as a URL) for a customer at a computer such as client computer 104 to access the server computer 100. (Step 200).

An operator, e.g., a customer service representative, registers with the server computer 100 via a computer such as client computer 106. The operator may select a log-on name which could be a pseudonym or "nickname" to protect his identity. In an alternative embodiment, the operator uses his real-life name to register with the system. Additionally, in a preferred embodiment, the operator is required to enter a secure password in a text area provided on a web page supplied by the server computer and displayed on the client computer 106. If the secure password along with the log-on name is verified by the server computer 100, the operator is then allowed to take calls from customers. This verification is done in a preferred embodiment by the server computer 100 verifying the operator's password stored in database 150 against the password entered by the operator on the web page. After his identity and password are verified by the server computer 100, the operator is placed in a queue, where the operator waits for a customer to "call-in" with a service request. (Step 202).

Figure 3:

Referring to FIG. 3, a customer operating a client computer such as computer 104 accesses a web page 300 which is maintained by the BE on a computer such as client computer 108. The customer wishes to contact a live operator to obtain more information about BE or its products and services. To do this, he clicks on icon 302 located on the BE web page 300. (Step 204).

Figure 4:
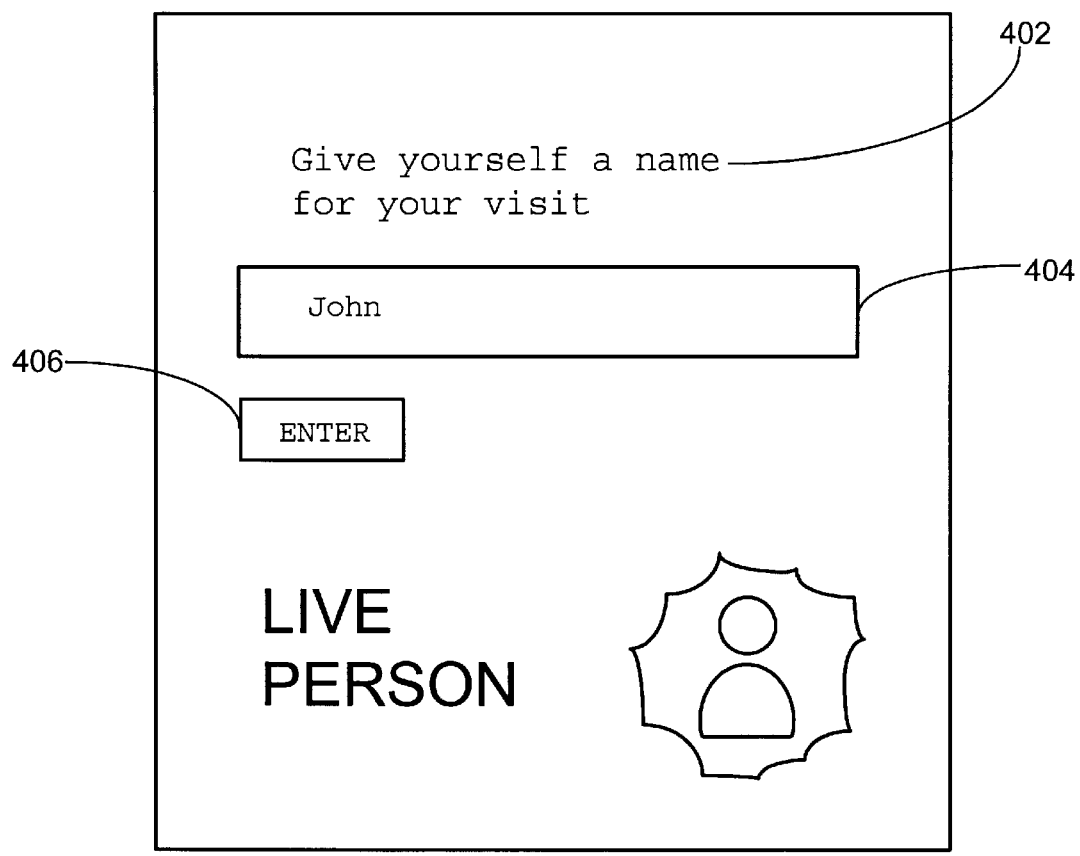

Referring to FIG. 4, the client computer 104 fetches from server computer 100 an ICSP web page 400 and displays it on its display device as a result of the customer accessing the icon 302 as in step 204. The ICSP web page 400 displays a request message 402 on the client computer 104 requesting the customer to enter his name in a text area 404 and click on a "Enter" button 406 provided thereon. In an alternative embodiment, the web page 300 also displays an indication that the customer has a pre-determined amount of time to respond to the request message 402 to enter his name in the text area 404. (Step 206). Assume the customer enters his name in the text area 404 provided on the web page 400 and clicks on the button 406.

Figure 5:
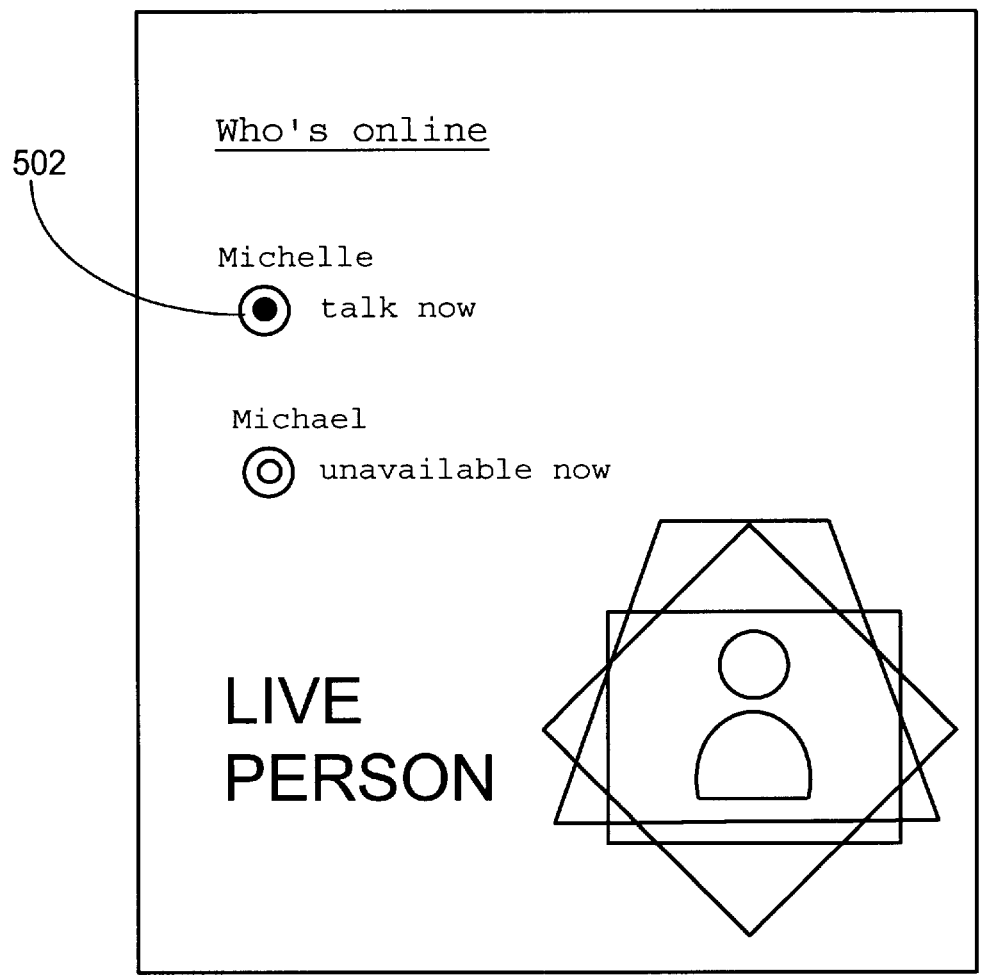
Figure 7A:
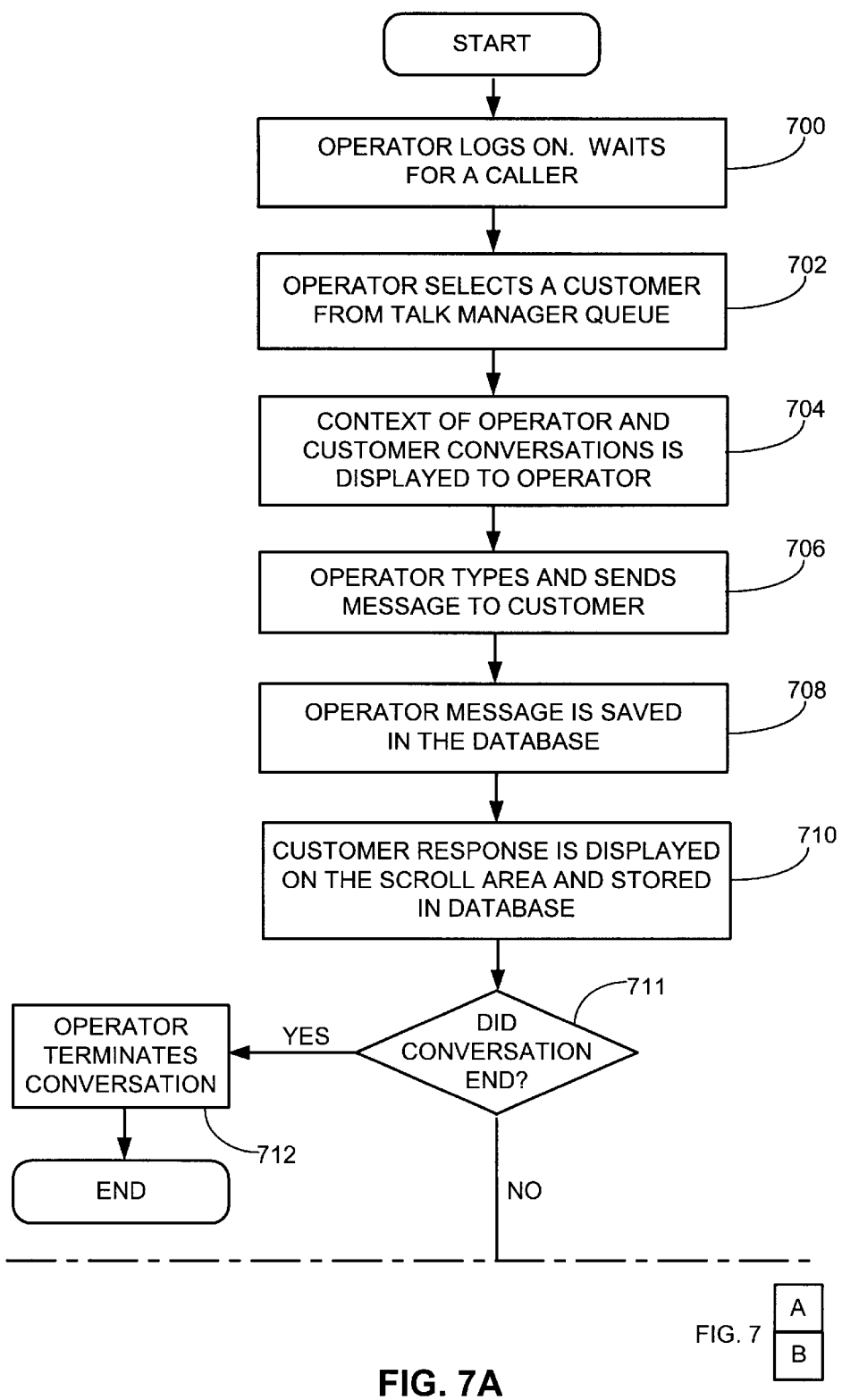

Referring to FIG. 5, after the customer enters his name in the text area 404 as in step 206, the invented system displays on the client computer 104 a web page 500 which shows in graphical form, how many operators, if any, are available to speak with the customer. In an alternative embodiment, the web page 500 may also contain additional information such as how long the customer would have to wait in queue in order to chat with an available operator. (Step 208). If, on the other hand, the customer does not enter his name in the text area 404 within the pre-determined time period, the invented system disables the web page 300 and exits the interaction with the customer. (Step 250).

Assume, for the purposes of illustration, that two operators are available. The customer may select either one of the operators by pointing a mouse or other pointing device on an appropriate area 502 of the web page 500 and clicking the mouse button. When an operator is selected by the customer, the invented system opens a "channel" of If, on the other hand, the customer wishes to talk to an operator who is not currently on line, or no operator is available to talk to the customer, the customer is presented with an option to leave a message for the operator along with the customer's e-mail address so that the operator can send a reply message to the customer via e-mail. (Step 220). The message left by the customer is then stored in the database 150 or other device until the operator for whom the message is intended logs on. (Step 222).

If the selected operator is available to talk to the customer, a new web page 600 shown in FIG. 6 is displayed on the client computer 104. Page 600 provides a text area 602 for the customer to type his messages to the selected operator. Two "button" areas are provided on the web page 600 to permit the customer either to "send" a message (button 604) or to "hangup" the call (button 606). The text messages sent by each party are displayed on the client computer on the web page 600 by using scrolling text 608. As messages are exchanged over the channel, old messages are either scrolled up or down to make room in the area 606 on web page 600. (Step 212).

The text messages that are sent by both parties are stored in the database 150 along with the names of the parties, the time and other related information. (Step 214).

In order to terminate the connection, the customer clicks on the "hangup" button 606 on his web page. In an alternative embodiment, the operator clicks on a "hangup" button on his web page to terminate the connection. (Step 216).

The Operator View

As indicated in Step 202 of FIG. 2, an operator, e.g., a customer service representative, logs on the system via the Internet 102 using a client computer 106. In an alternative embodiment, the operator may log on the server computer 100 via a local area network or via a terminal device attached to the server computer 100. This step is similar to step 202. These log on steps are represented by Step 700 in FIG. 7.

Figure 8:
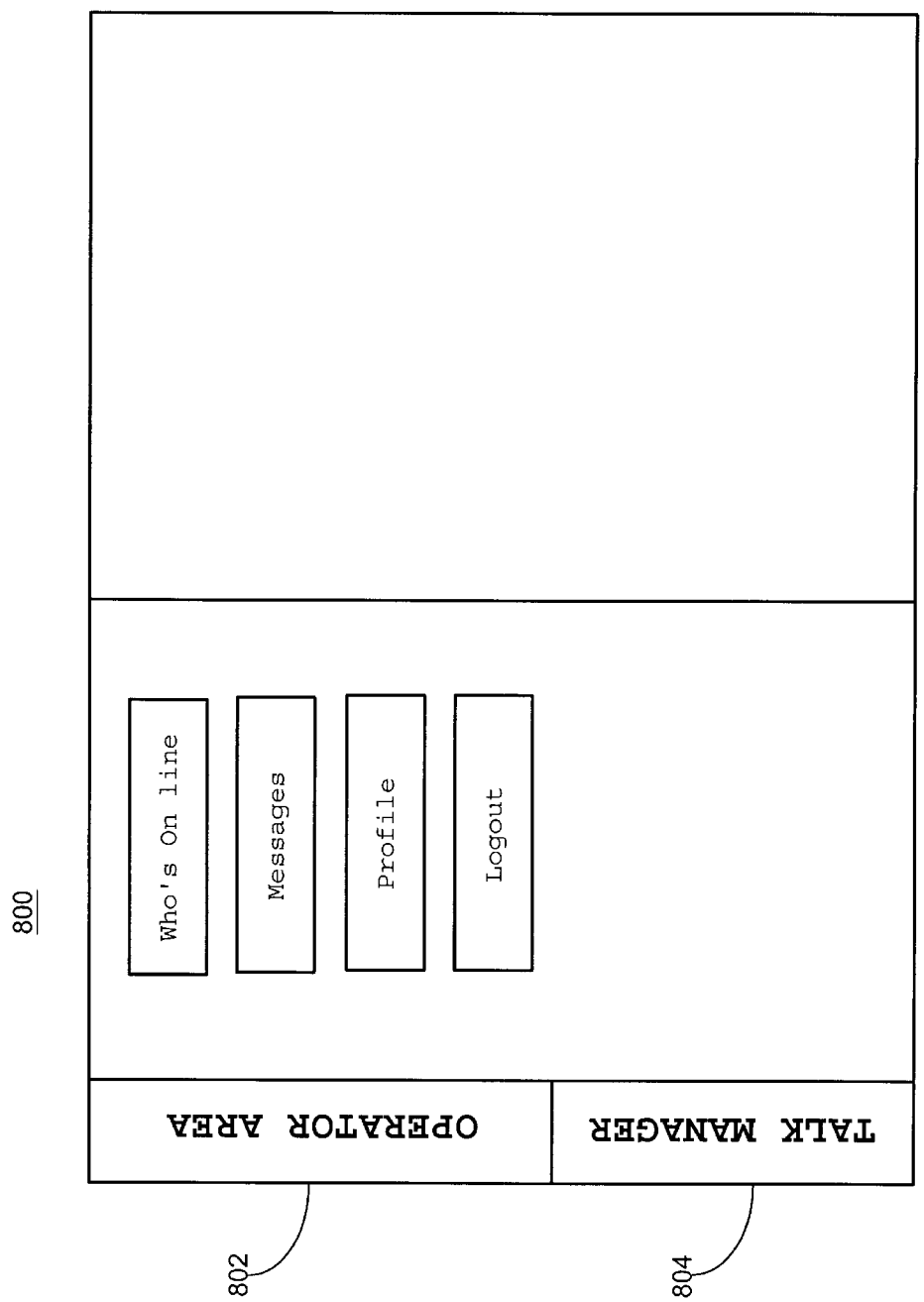

When the operator logs on, an operator web page 800 shown in FIG. 8 is displayed at the client computer 106. The operator web page 800 comprises a number of display entities called frames. In the Internet terminology, a frame is designed as a part of a web page. In reality, a frame is a "mini" web page. If a web browser program is capable of displaying frames, a web page can be created to constitute a number of frames, all of which are displayed together in the web page. An example of a web browser that can support frames is Netscape® Communicator™ version 4.04. In a preferred embodiment, the operator web page 800 comprises two distinct "areas." Advantageously, these areas are named "Operator Area" 802 and "Talk Manager Area" 804. Each of these areas is designed to comprise a group of frames. An operator can use a pointing device such as a computer mouse to click on an area to display the contents of the frame on the display device.

Figure 9:
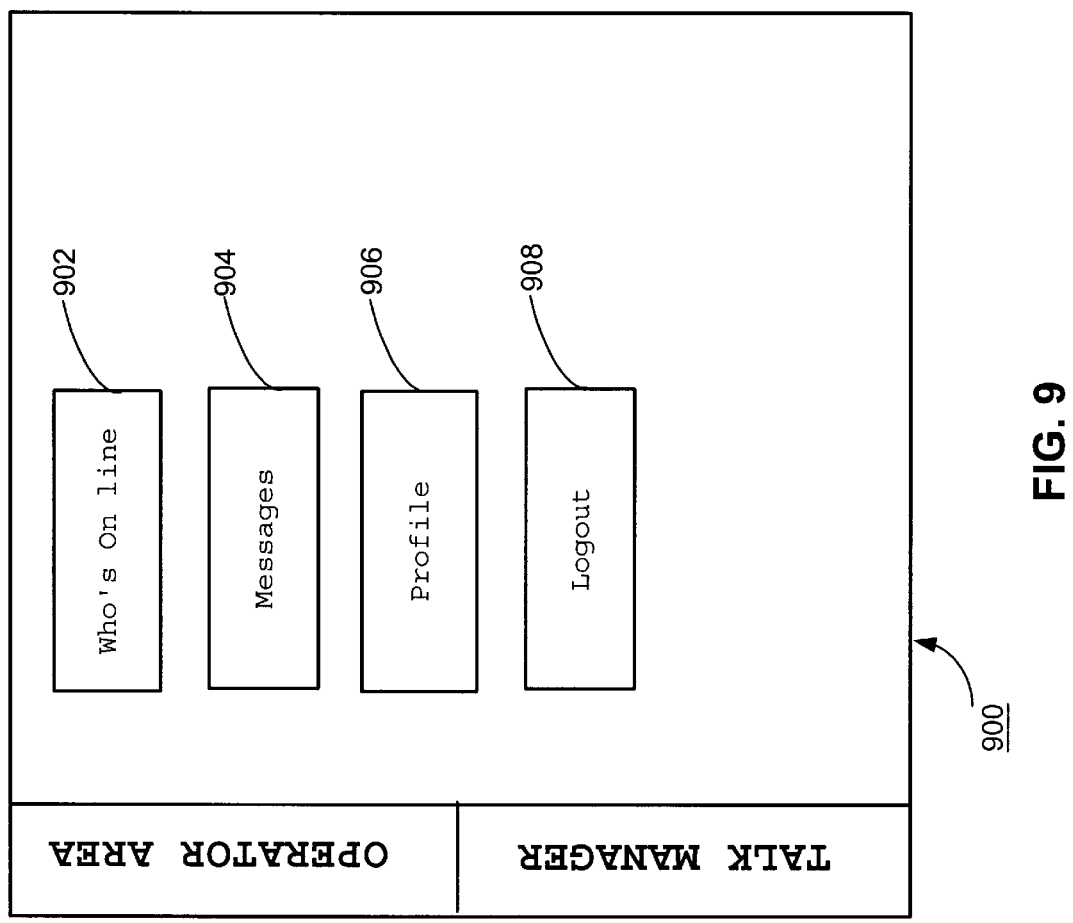

Referring to FIG. 9, the "Operator Area" screen contains a number of sensitive areas called buttons. When an operator points and clicks a computer mouse on these buttons, a new screen is displayed on the client computer 106. In a preferred embodiment, four buttons are provided: "Who's On Line" 902, "Messages" 904, "Profile" 906 and "Logout" 908. If the operator clicks on the "Logout" button 908, the operator is logged out and disconnected from the server computer 100. The operator is then required to follow the steps described in step 202 to sign on to the system again.

Figure 10:
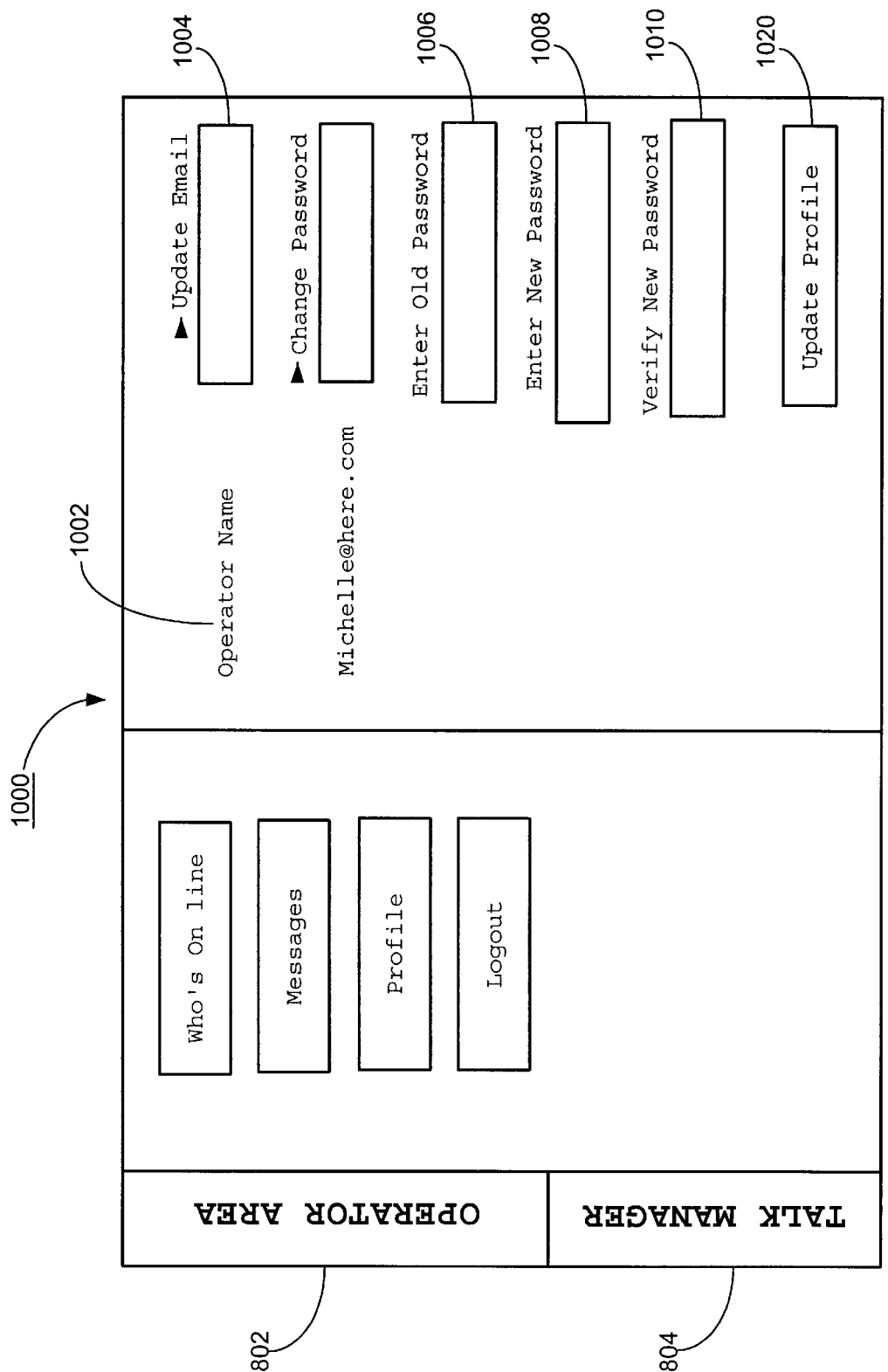

Referring to FIG. 10, if the operator clicks on the "Profile" button 906, a web page 1000 is displayed on the client computer 106. Displayed on the web page 1000 are the operator's log-in name and e-mail address 1002, and a text area 1004 to allow an operator to change the operator's e-mail address. An operator can change his e-mail address by entering the new address in the text area 1004 and clicking on a button, labeled "Update Profile" 1020. The operator is also allowed to update his secure password by entering an old password in a text area 1006, a new password in two text areas 1008 and 1010 for verification and clicking on the button "Update Profile" 1020. When the operator clicks on the button "Update Profile" 1020, the client computer 106 sends an 'update' message to the server computer 100, which verifies that the "old password" entered is correct, and if so, updates its database entries with the new password. If not, the server computer 100 sends an error message to the client computer 106 to be displayed to the operator.

Figure 11:
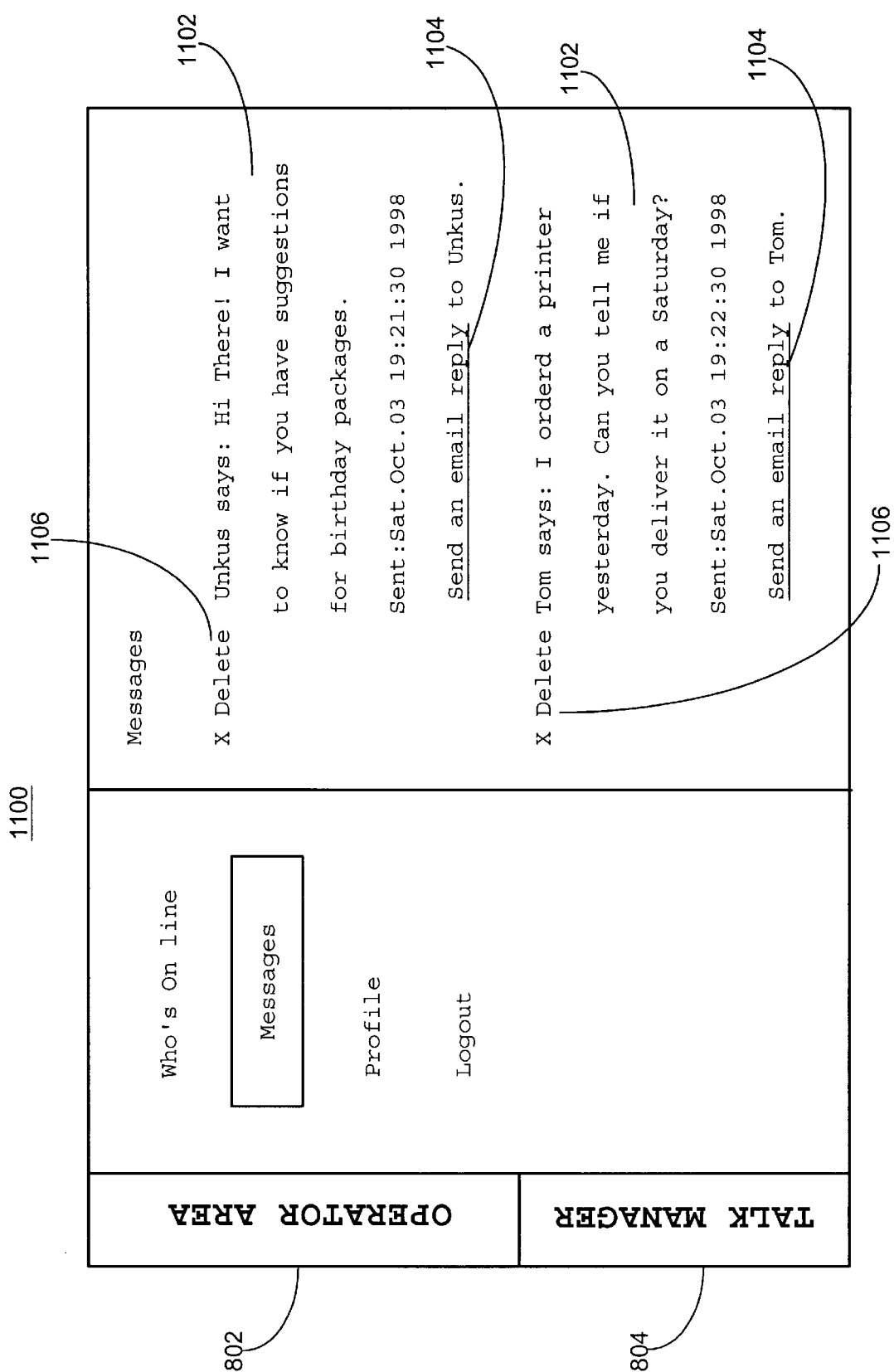

Referring to FIG. 11, if the operator clicks on the "Messages" button 904, a web page 1100 is displayed on the client computer 106. The web page displays any pending e-mail messages 1102 left for the operator. Additionally, the operator is provided sensitive areas or hyper-links 1104 to reply to a message, or to delete the messages 1106 by clicking on the sensitive areas or hyper-links.

Figure 12:
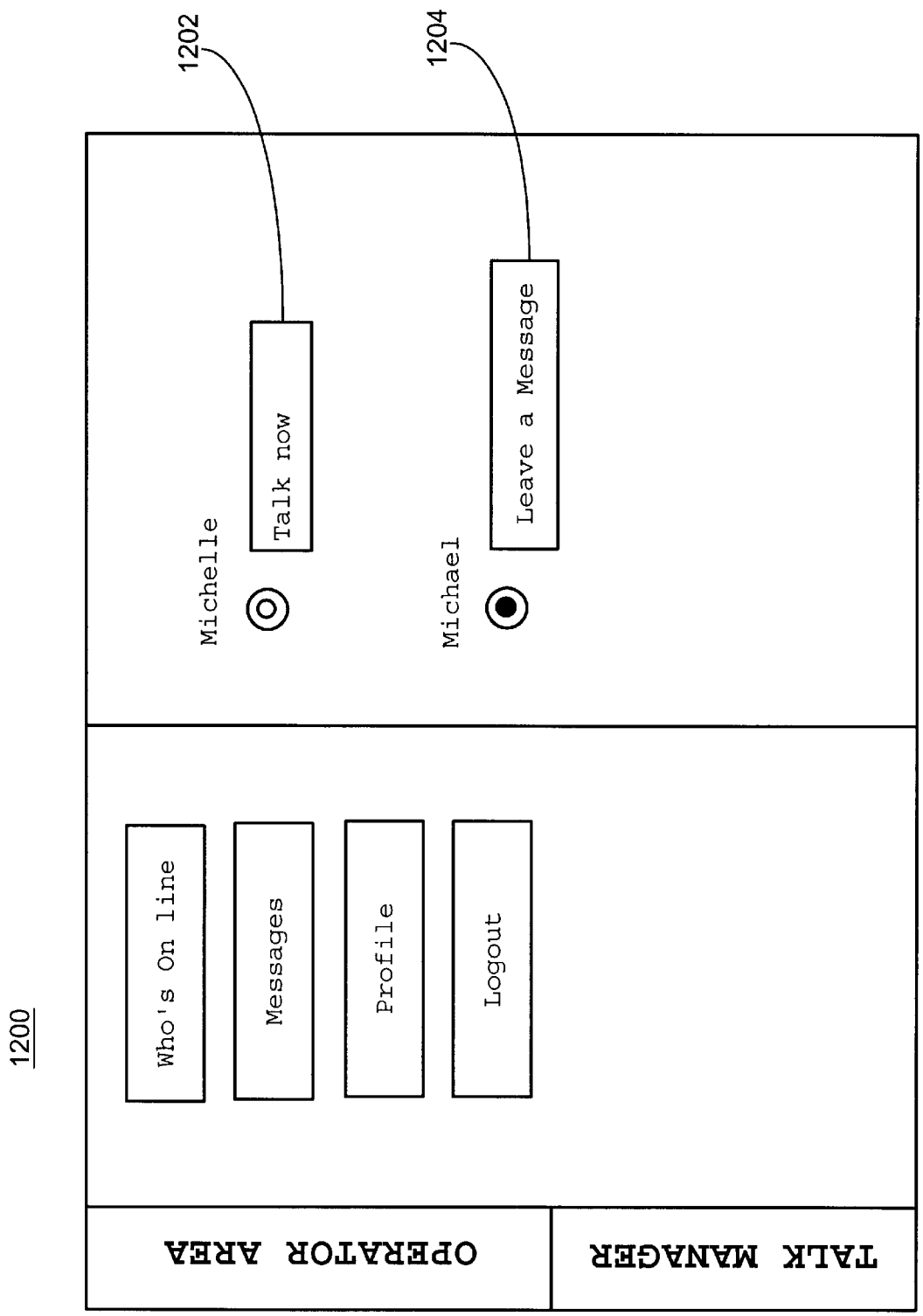

Referring to FIG. 12, if the operator clicks on the "Who's On Line" button 902, a web page 1200 is displayed on the client computer 106. The web page displays the operators who are currently either "on hold" waiting for a customer, or off-line. By clicking the buttons 1202 and 1204, an operator can either chat with an operator who is on hold or leave a message for an operator who is off-line. In a preferred embodiment, a blinking green button indicates that an operator is "on hold," i.e., waiting for a customer.

Figure 13:
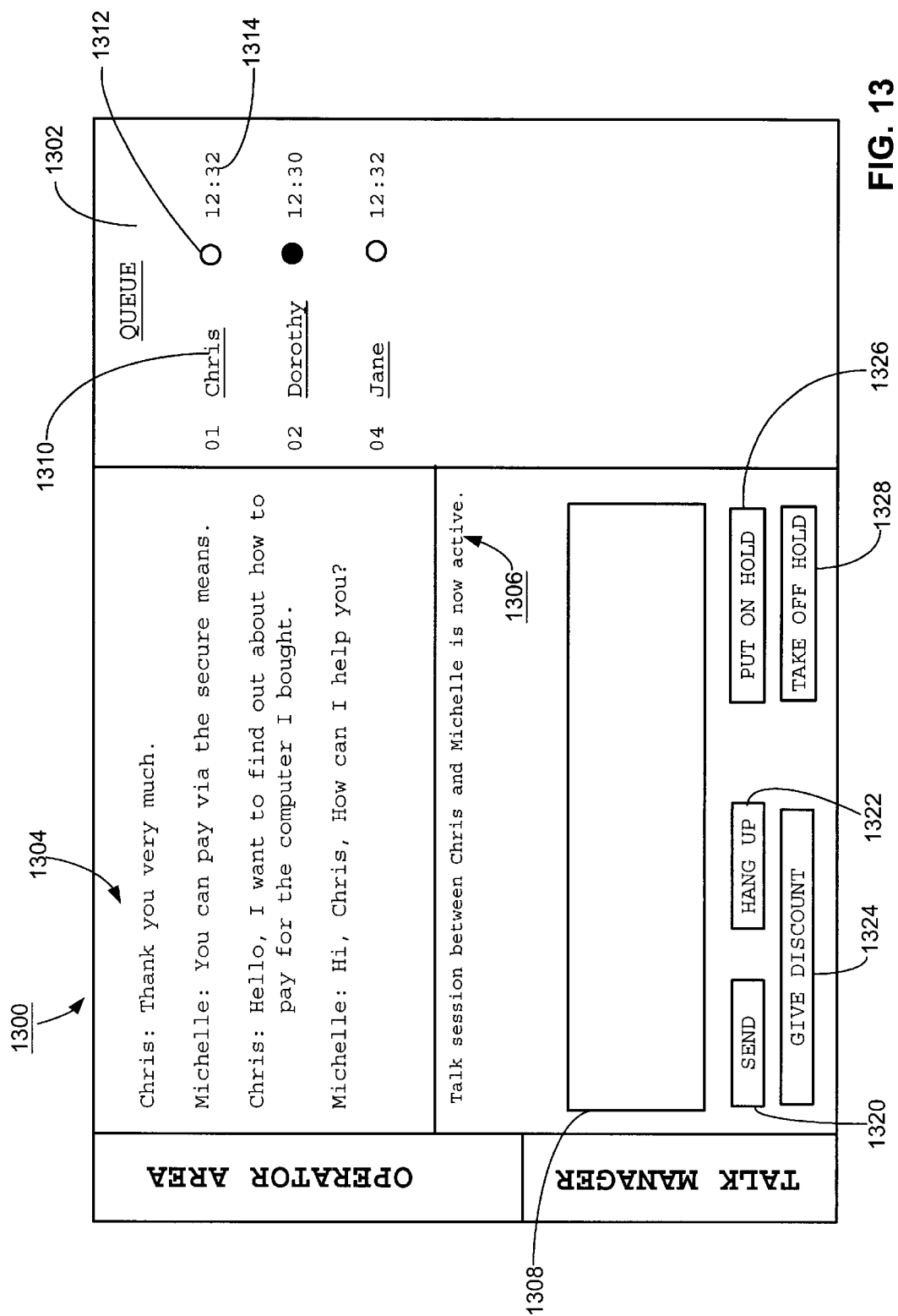

Referring to FIG. 13, if the operator selects the Talk Manager area 904, a "Talk Manager" web page 1300 is displayed on the client computer 106. The "Talk Manager" web page 1300 comprises a number of frames. In one frame, a "Queue" 1302 displays a list of customers who selected to talk to the operator and are waiting for him. Displayed in the "Queue" frame are the names 1310 (preferably nicknames) of each customer, an indicator 1312 whether the customer is currently in conversation with the operator, and a time indicator 1314 showing how long the customer is conversing with the operator. In an alternative embodiment, other indicators can be displayed on this frame.

A second frame, containing a scroll area 1304, displays scrolling text messages of on-going conversation between the operator and the customer with whom the operator is currently in conversation. A third frame 1306 contains a text area 1308 where an operator can type a message to a selected customer. Also provided in a preferred embodiment are four buttons, "send" 1320, "hangup" 1322, "give discount" 1324, "put on hold" 1326 and "take off hold" 1328. The functionality associated with each of the above-mentioned buttons is explained below.

When the client computer 106 displays the "Talk Manager" web page, an operator can select any one of the customers waiting for the operator as indicated by the Queue frame 1302. Suppose the operator wishes to talk to a customer Jane. The operator clicks on a button 1330 that appears next to the name Jane on the frame Queue. (Step 702). Then the operator can talk to Jane, and any previously communicated messages between Jane and the operator are displayed in the scroll area 1304 frame. This feature enables the operator to determine the context of his conversation with Jane. (Step 704) The operator can type any message in the text area 1308 and click on the "send" button 1320 to transmit the message in order to be displayed on a computer operated by Jane. (Step 706). Additionally, the transmitted message is also displayed in the scroll area 1304. (Step 708). If Jane responds to the operator's message with a reply message, the reply message is displayed in the scroll area 1304 as well as stored in the database 150. (Step 710).

The operator can terminate the conversation with Jane by pressing the "hangup" button 1322. (Step 712). Alternatively, the operator may place the conversation with Jane on hold by pressing the "put on hold" button 1326. (Step 714). If Jane is previously placed on hold, the operator can re-initiate the conversation by pressing the "take off hold" button 1328. Alternatively, the operator can press the "give discount" button 1324 and send Jane an electronic coupon which can be used by Jane if she chooses to purchase a product or service from the BE. The electronic coupon could be in the form of an electronic "signature" message sent from the server computer 100 to the client computer 104. (Step 716).

When the operator places Jane on hold, if there are other customers waiting for the operator as displayed in the Queue 1302 frame, the operator can initiate conversation with any one of these customers by clicking the buttons associated with their names as described above. In this manner, one operator is equipped with the capability to talk to many customers at the same time. Finally, the operator can terminate the conversation with Jane by pressing the "hangup" button 1322. (Step 718).

The Administrator's View

Figure 14:
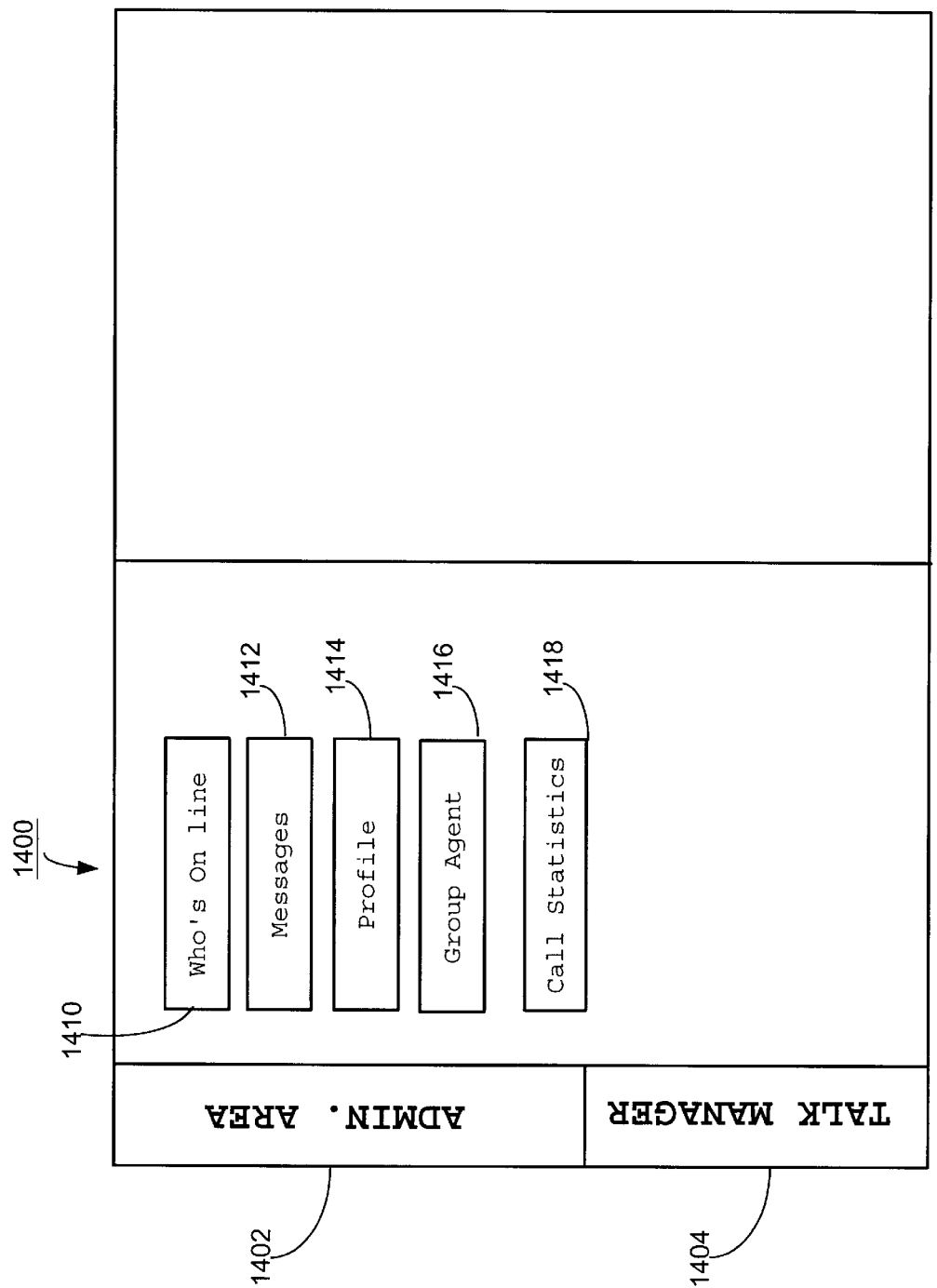

Referring to FIG. 14, if a user at a computer such as client computer 106 logs-on the server computer 100 as an administrator, an administrator's view web page 1400 is presented to the client computer 106. Similar to an operator web page 800, an administrator web page 1400 comprises two areas, named "Admin Area" 1402 and "Talk Manager" 1404.

If an administrator selects the "Admin Area" button 1402, the server computer 100 displays the web page 1500 with buttons "Who's On Line" 1410, "Messages" 1412, "Profile" 1414, "Group Agent" 1416, and "Call Statistics" 1418. The first three buttons, "Who's On Line" 1410, "Messages" 1412 and "Profile" 1414 are similar in character to the buttons 902, 904 and 906 described in relation to the Operators's View of the system. The principal difference between the Administrator's View and the Operator's View is that an Administrator can view the details pertaining to all operators, whereas an operator can view only his details.

Referring to FIG. 15, if the "Group Agent" 1416 button is selected by an administrator, the server computer 100 displays the web page 1500 on the client computer 106. This web page 1500 displays the groupings in which operators are assigned. It may be recalled that a single operator can serve a number of customers, communicating with one at a time, by placing other customers on hold when the operator is communicating with one customer.

When a customer contacts the ICSP to talk to a live operator, the customer may be interested in obtaining information about any one of the several business entities who registered with the ICSP. The invented system provides a method for persons interested in a business entity to be served by a pre-designated group of operators. This pre-designation is depicted on the Group Agent web page 1500 and other web pages illustrating an administrator user interface as shown in FIGS. 19–25. An administrator can delete a grouping, add a new grouping of operators, or can view the types of interactions an operator had with customers by navigating a series of web pages. Though for the purposes of illustration groups with certain attributes are shown, the invention is not limited by the attributes used in the illustrations.

Referring to FIGS. 16–17, if an administrator clicks on the "Call Statistics" button 1408, a Call Statistics web page 1600 is displayed on the client computer 106. Statistics related to calls received, sorted by dates are displayed in the web page 1600. In a preferred embodiment, an administrator can click on a hyper-link provided on a date 1602 to display a web page 1700 that depicts a call log containing a more detailed view of the calls received on the date 1602. A text area 1702 is provided to allow the administrator to type a key word and search the day's call log for a specific piece of information. The administrator can also view the transcript for a conversation by clicking on an icon 1704. Other operations such as sorting and searching the entries in the call logs can be performed in alternative embodiments. Additionally, the administrator can delete entries by checking a "check box" button 1706 provided next to log entries and clicking an update button provided on the web page 1700.

Figure 18:
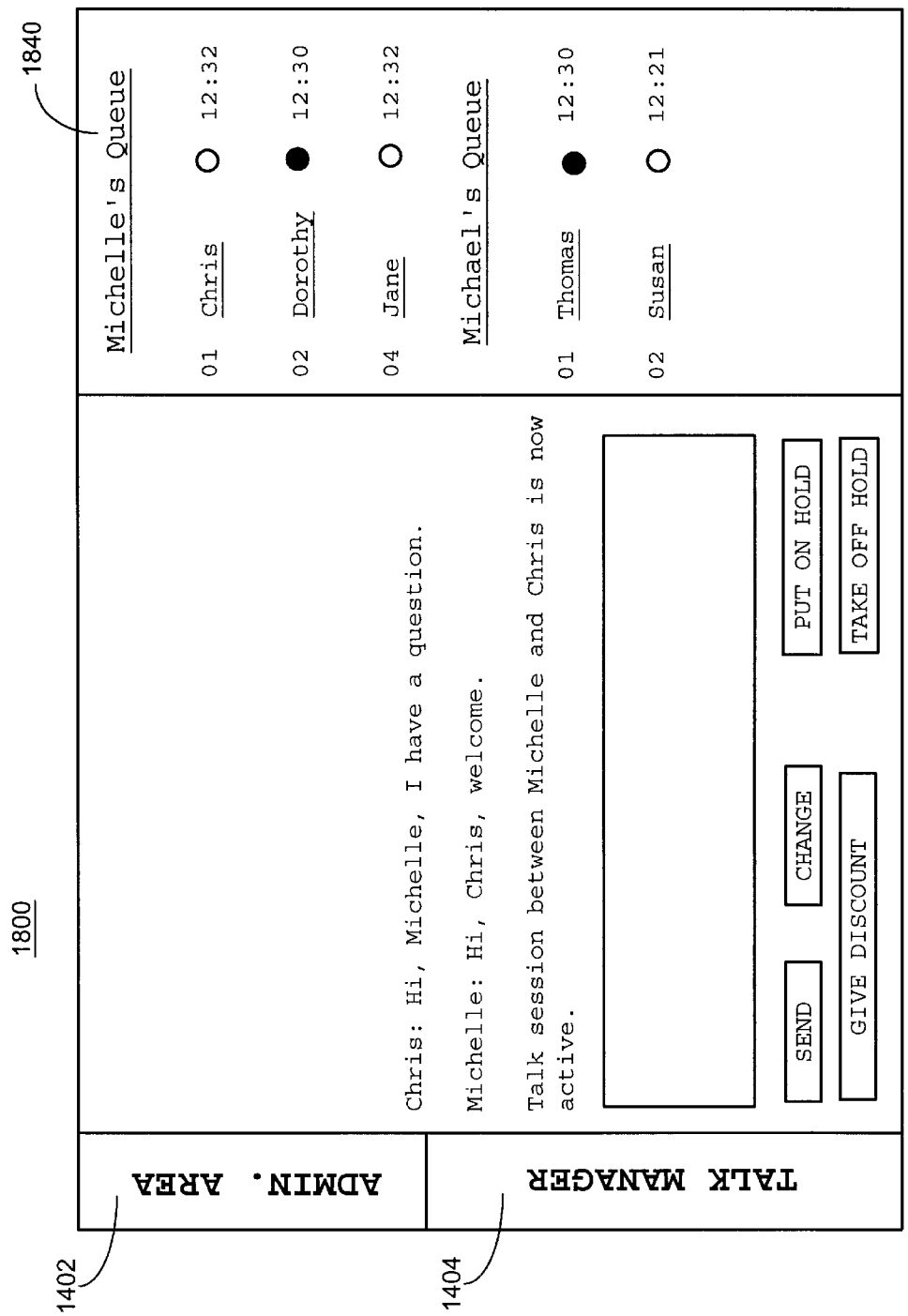
Figure 22:
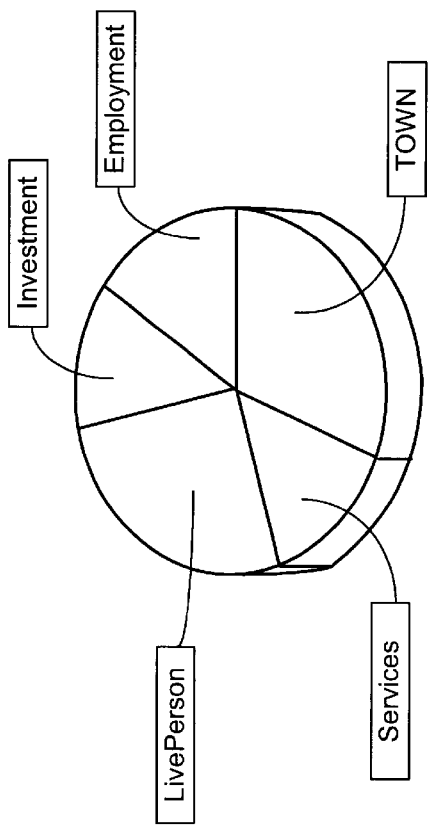

Referring to FIG. 18, if the administrator selects the "Talk Manager" button 1404, a web page 1800 is displayed. The web page 1800 contains similar information to that described in reference to the "Talk Manager" web page 1300 in the Operator's View section above. The main difference between the two web pages is that, while an operator queue 1302 displays all the customers waiting for the operator, an administrator queue 1840 displays all the queues of all operators. In this manner, an overall view of the entire system can be viewed by an administrator.

The invention also features a "Newsletter" option for a customer. A customer may simply request a newsletter to be sent to his e-mail address by filling in a form displayed by the server computer 100 on the client computer 104. The information from the form is entered in the database 150 and is used to send a newsletter to the customer at the postal or electronic address given by the user.

It should be noted that the operators can participate in the system by simply logging in via the Internet. Accordingly, unlike telephone call centers and help desks, operators may work from any distant location they prefer.

There is described a new and useful method and system wherein a packet-switched network based call center facilitates provisioning of customer service by an operator who can chat with a customer via a web browser. It should be understood that various modifications to the invention will be readily apparent to a person skilled in the art without departing from the spirit and scope of the invention or without undue experimentation. For example, the implementation of the web pages can be performed in any programming language such as JavaScript™, Java™, Active Server Pages™, HTML or other methods and languages. Additionally, several modifications can be made to the manner in which an administrator can view, sort or search the call logs; other networks such as Asynchronous Transfer Mode, Asymmetrical Digital Subscriber Line, and other technologies can be used to replace the data network described herein; and an operator can be allowed to perform additional functions that are not described herein. Accordingly, all such modifications and departures should be considered to be within the scope of the invention.

What is claimed is:

1. A method of providing customer service on behalf of a plurality of business entities each having a web page, via a customer service server computer connected to a communications network, the method comprising the steps of:

establishing on the web page of each of the plurality of business entities a link via the communications network to the customer service server computer;

upon selection by a customer of the link established on the web page of one of the plurality of business entities, causing a packet switched connection to be established between the customer and a customer service operator in communication with the customer service server computer;

sending a request message from the customer to the customer service operator via the packet switched connection;

displaying the request message to the customer service operator;

sending a response message from the customer service operator to the customer via the packet switched connection; and displaying the response message to the customer.

2. The method of claim 1, wherein the customer service server computer is configured to establish a plurality of packet switched connections simultaneously with a plurality of customers requesting information about a plurality of business entities, and the request and response messages between the customer service operator and each customer is not accessible by other customers.

3. The method of claim 2, wherein the plurality of customers are placed in a queue until the customer service operator selects them to respond to their request messages.

4. The method of claim 2, wherein the customer service server computer displays at least a portion of prior request and response messages between a customer and the customer service operator on the operator computer.

5. Computer executable software code stored on a computer-readable medium to perform the method of claim 1.

6. At least one of a plurality of programmed general purpose computers configured to execute a software program to perform the method of claim 1.

7. The method of claim 1 wherein the request message is in a text format.

8. The method of claim 1 wherein the response message is in a text format.

9. The method of claim 1 further comprising the step of displaying to the customer service operator the operator's response message to the request message in addition to the customer's request message.

10. The method of claim 1 further comprising the step of displaying to the, customer the customer's request message in addition to the operator's response message.

11. The method of claim 1 further comprising the step of recording the message displayed to the customer service operator in a storage medium coupled to the server computer.

12. The method of claim 1 wherein a plurality of customer service operators are available, said method further comprising the steps of:

selecting the customer service operator to whom a request message is to be sent and sending the request message to the selected customer service operator.

13. The method of claim 1, wherein upon selection by a customer of the link established on the web page, the customer service server computer sends to the customer a list of customer service operators in communication with the customer service server computer, and upon selection by the customer of a customer service operator, a packet switched connection is established between the customer and the selected customer service operator.

14. A method of providing customer service on behalf of a plurality of business entities each having a web page, via a customer service server computer connected to a communications network, the method comprising the steps of:

establishing on the web page of each of the plurality of business entities a link via the communications network to the customer service server computer;

upon selection by a customer of the link established on the web page of one of the plurality of business entities, causing a packet switched connection to be established between the customer and a customer service operator in communication with the customer service server computer;

sending a request message from the customer to the customer service operator via the packet switched connection; and sending a response message from the customer service operator to the customer via the packet switched connection.

15. The method of claim 14, wherein a plurality of customer service operators are available, said method further comprising the steps of:

selecting the customer service operator to whom a request message is to be sent and sending the request message to the selected customer service operator.

16. The method of claim 14, wherein the customer service server computer is configured to establish a plurality of packet switched connections simultaneously with a plurality of customers requesting information about a plurality of business entities, and request and response messages between the customer service operator and each customer is not accessible by other customers.

17. The method of claim 16, wherein the plurality of customers are placed in a queue until the customer service operator selects them to respond to their request messages.

18. The method of claim 16, wherein the customer service server computer displays at least a portion of prior request and response messages between the customer and the operator on the operator computer.

19. Computer executable software code stored on a computer-readable medium to perform the method of claim 14.

20. The method of claim 14, wherein a plurality of customer service operators communication with the customer service server computer and are separated into a plurality of groups, each group comprising at least one customer service operator, and wherein each of the plurality of business entities is served by a pre-designated group of customer service operators.

* * * * *